United States Patent Office 3,192,203
Patented June 29, 1965

3,192,203
6-HALO-6-DEHYDRO STEROIDS
Howard J. Ringold, Shrewsbury, Mass., assignor to Syntex Corporation, Panama, Panama, a corporation of Panama
No Drawing. Filed May 9, 1963, Ser. No. 279,311
Claims priority, application Mexico, Sept. 24, 1958, 52,203
24 Claims. (Cl. 260—239.55)

This application is a continuation-in-part of my co-pending application Serial No. 826,121, filed July 10, 1959.

The present invention relates to cyclopentanophenanthrene derivatives.

More particularly the present invention relates to new 6-halo-$\Delta^{4,6}$ and $\Delta^{1,4,6}$ cortical hormones having at C–16$\alpha$ a hydroxyl group, which may have at C–9$\alpha$ a halogen atom and to its esters and 16$\alpha$,17$\alpha$-cyclic ketals and acetals. These new compounds may be expressed by the following formula:

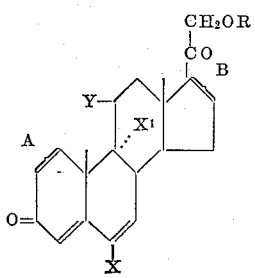

wherein A represents a single or double bond, Y represents =O or

X represents fluorine or chlorine, $X^1$ is selected from the group consisting of hydrogen, fluorine and chlorine; B represents 16$\alpha$,17$\alpha$-dihydroxy, 16$\alpha$-acyloxy-17$\alpha$-hydroxy or a cyclic ketal or acetal at C–16$\alpha$,17$\alpha$; R represents hydrogen or a hydrocarbon carboxylic acid acyl group of up to 12 carbon atoms. The acyl groups are derived from hydrocarbon carboxylic acids containing from 1 to 12 carbon atoms and may be saturated or unsaturated, straight chain or branched chain, cyclic or cyclic-aliphatic, and may be substituted by hydroxy, acyloxy containing from 1 to 12 carbon atoms, alkoxy containing from 1 to 5 carbon atoms, halogen or other groups. Typical ester groups are the acetate, propionate, butyrate, hemisuccinate, enanthate, caproate, benzoate, trimethylacetate, acetoxy acetate, phenoxyacetate, phenylpropionates, cyclopentylpropionates and $\beta$-chloropropionates. When X is chlorine, B is preferably a cyclic acetal or ketal.

The novel compounds, object of the present invention, are potent cortical hormones having the desirable mineral corticoid activity; they exhibit glycogenic, eosinopenic, thymolytic and anti-inflammatory activity.

The following equation illustrates a process for preparing the new compounds heretofore set forth:

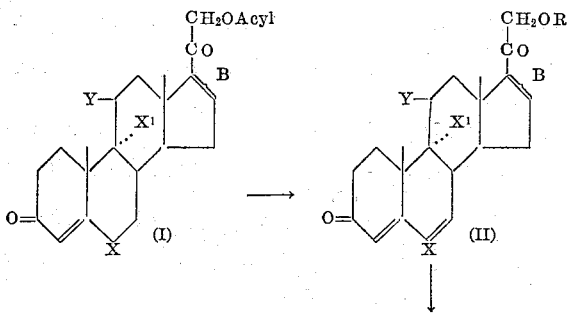

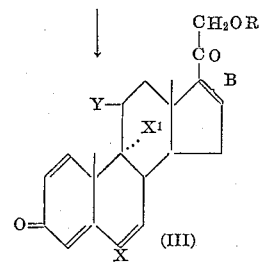

In the above formulas X, $X^1$, Y, B and R represent the same groups as heretofore set forth.

The starting materials used in practicing the process illustrated by the above equation have been disclosed and claimed in U.S. applications Serial No. 762,232, filed September 22, 1958, and Serial No. 819,545, filed June 11, 1959, now U.S. Patent No. 3,126,375.

In practicing the process of the present invention, a 21-ester of the monounsaturated $\Delta^4$-compound (I) is heated with tetrachloro-p-benzene-quinone (chloranil). When this heating is carried out in a mixture with xylene, a $\Delta^{4,6}$-diene is obtained as the main product, whereas in a mixture with n-amyl alcohol, a $\Delta^{1,4,6}$-triene is obtained as the main product.

The $\Delta^{4,6}$-dienes (II) may be converted into the $\Delta^{1,4,6}$-trienes (III) by a second refluxing with chloranil, this time with n-amyl alcohol, or by refluxing with selenium dioxide, preferably in mixture with t-butanol and in presence of catalytic amounts of pyridine.

The esters of the dienes and trienes were converted into the free alcohols by treatment with a diluted methanolic solution of potassium hydroxide or sodium methoxide under an atmosphere of nitrogen and at low temperatures. The primary and secondary hydroxyl groups were reesterified by reacting with the anhydride of a hydrocarbon carboxylic acid of up to 12 carbon atoms in pyridine solution.

In the case of 16$\alpha$,17$\alpha$-ketals or -acetals B represents

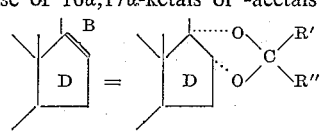

wherein R' stands for a hydrocarbon residue and R'' for hydrogen atom or a hydrocarbon residue. R' and R'' can also stand jointly for a cyclic hydrocarbon. The formation of ketals and cyclic acetals by reacting an $\alpha$-glycol with a ketone or an aldehyde in the presence of a catalyst of a dehydrating agent, such as zinc chloride, is a known reaction. Applied to steroid compounds there were prepared, for example, acetonides by treating an acetone solution of a steroid, having in the molecule a cis-glycol grouping, with dry hydrogen chloride gas under anhydrous conditions. For the formation of cyclic 16$\alpha$,17$\alpha$-ketals and acetals there was used the method of Fried et al. (J. Am. Chem. Soc. 80, 2338 (1958)), involving agitating a mixture of the steroid with the ketone or aldehyde, at room temperature, in the presence of small amounts of mineral acid, preferably perchloric acid.

The following specific examples serve to illustrate but are not intended to limit the present invention.

*Example I*

A mixture of 5 g. of the 21-acetate of 6$\alpha$-fluoro-16$\alpha$-hydroxy-hydrocortisone, 8 g. of chloranil and 200 cc. of xylene was refluxed during 12 hours, cooled, diluted with ether, washed with water, 5% sodium carbonate solution and again with water until neutral, dried over anhydrous sodium sulfate, filtered and concentrated to dryness under reduced pressure. Chromatography on alumina produced the 21-acetate of 6-fluoro-$\Delta^{4,6}$-pregnadien11$\beta$,16$\alpha$,17$\alpha$,21-tetrol-3,20-dione.

3 g. of the above compound was mixed with 150 cc. of anhydrous t-butanol, 1.2 g. of selenium dioxide (recently sublimed) and 0.6 cc. of pyridine; the mixture was refluxed under an atmosphere of nitrogen for 48 hours, cooled, diluted with ethyl acetate, filtered through Celite, and the filtrate was evaporated under reduced pressure. The residue was refluxed with decolorizing carbon in acetone solution for 1 hour, the carbon was filtered, the acetone was evaporated and the residue was purified by chromatography over alumina to give the 21-acetate of 6-fluoro-$\Delta^{1,4,6}$-pregnatriene-11$\beta$,16$\alpha$,17$\alpha$,21-tetrol-3,20-dione.

*Example II*

A mixture of 3 g. of the 21-acetate of 6$\alpha$-fluoro-16$\alpha$-hydroxy hydrocortisone, 5 g. of chloranil and 120 cc. of n-amyl alcohol, was refluxed for 16 hours and was worked up as described in the first paragraph of Example I. There was obtained the 21-acetate of 6-fluoro-$\Delta^{1,4,6}$-pregnatrien-11$\beta$,16$\alpha$,17$\alpha$,21-tetrol-3,20-dione, identical with the final compound of Example I.

*Example III*

3 g. of the 21-acetate of 6-fluoro-$\Delta^{4,6}$-pregnadien-11$\beta$,16$\alpha$,17$\alpha$,21-tetrol-3,20-dione, the intermediate of Example I, was refluxed in mixture with 5 g. of chloranil and 120 cc. of n-amyl alcohol for 18 hours; the reaction product was then worked up as described in the first paragraph of the said example. There was thus obtained the 21-acetate of 6-fluoro-$\Delta^{1,4,6}$-pregnatrien-11$\beta$,16$\alpha$,17$\alpha$,21-tetrol-3,20-dione.

*Example IV*

By the method of Example I, the 21-propionate of 6$\alpha$-fluoro-16$\alpha$-hydroxy hydrocortisone was converted to the 21-propionate of 6-fluoro-$\Delta^{4,6}$-pregnadien-11$\beta$,16$\alpha$,17$\alpha$,21-tetrol-3,20-dione, and by the subsequent reaction with selenium dioxide, there was formed the 2-propionate of 6-fluoro-$\Delta^{1,4,6}$-pregnatrien-11$\beta$,16$\alpha$,17$\alpha$,21-tetrol-3,20-dione.

*Example V*

By the methods of the previous examples there were obtained:

| Starting material | $\Delta^{4,6}$-compounds | $\Delta^{1,4,6}$-compounds |
|---|---|---|
| 21-acetate of 6$\alpha$-fluoro-16$\alpha$-hydroxy-cortisone. | 21-acetate of 6-fluoro-4,6-pregnadien-16$\alpha$,17$\alpha$,21-triol-3,11,20-trione. | 21-acetate of 6-fluoro-1,4,6-pregnatrien-16$\alpha$,17$\alpha$,21-triol-3,11,20-trione. |
| 21-acetate of 6$\alpha$-fluoro-16$\alpha$-hydroxy hydrocortisone. | 21-acetate of 6-fluoro-4,6-pregnadien-11$\beta$,16$\alpha$,17$\alpha$,21-tetrol-3,20-dione. | 21-acetate of 6-fluoro-1,4,6-pregnatrien-11$\beta$,16$\alpha$,17$\alpha$,21-tetrol-3,20-dione. |
| 16-acetate-21-cyclopentylpropionate of 6$\alpha$-fluoro-16$\alpha$-hydroxy-hydrocortisone. | 16-acetate-21-cyclopentylpropionate of 6-fluoro-4,6-pregnadien-11$\beta$, 16$\alpha$, 17$\alpha$, 21-tetrol-3, 20-dione. | 16-acetate-21-cyclopentylpropionate of 6-fluoro-1,4,6-pregnatriene-11$\beta$,16$\alpha$,17$\alpha$,21,tetrol-3, 20-dione. |
| acetonide of 21-acetate of 6$\alpha$-chloro-16$\alpha$-hydroxy-hydrocortisone. | acetonide of 21-acetate of 6-chloro-4,6-pregnadien-11$\beta$,16$\alpha$,17$\alpha$,21-tetrol-3,20-dione. | acetonide of 21-acetate of 6-chloro-1,4,6-pregnatrien-11$\beta$,16$\alpha$,17$\alpha$,21-tetral-3,20-dione. |
| 21-acetate of 6$\alpha$,9$\alpha$-difluoro-16$\alpha$,17$\alpha$-ethylenedioxy-$\Delta^4$-pregnen-11$\beta$,21-diol-3, 20-dione. | 21-acetate of 6,9$\alpha$-difluoro-16$\alpha$,17$\alpha$-ethylenedioxy-4-6-pregnadien-11$\beta$,21-diol-3,20-dione. | 21-acetate of 6, 9$\alpha$-difluoro-16$\alpha$,17$\alpha$-ethylenedioxy-1,4,6-pregnatrien-11$\beta$,21-diol-3,20,dione. |
| 21-acetate of 6$\alpha$,fluoro-16$\alpha$,17$\alpha$-dioxycyclohexyl-$\Delta^4$-pregnen-21-ol-3,11,20-trione. | 21-acetate of 6-fluoro-16$\alpha$,17$\alpha$-dioxycyclohexyl-4,6-pregnadien-21-ol-3,11,20-trione. | 21-acetate of 6-fluoro-16$\alpha$,17$\alpha$-dioxycyclohexyl-1,4,6-pregnatrien-21-ol-3,11,20-trione. |

*Example VI*

2 g. of the 21-acetate of 6-fluoro-$\Delta^{4,6}$-pregnadien-11$\beta$,16$\alpha$,17$\alpha$,21-tetrol-3,20-dione of Example IV was suspended in 20 cc. of absolute methanol, cooled to 0° C. and mixed with a solution of sodium methoxide prepared by dissolving 120 mg. of metallic sodium in 20 cc. of absolute methanol. The mixture was stirred for 1 hour under nitrogen atmosphere and at 0° C., poured into 100 cc. of cold saturated aqueous sodium chloride solution containing a few drops of acetic acid; the precipitate was filtered, washed with water and dried. Crystallization from acetone-hexane give free 6-fluoro-$\Delta^{4,6}$-pregnadien-11$\beta$,16$\alpha$,17$\alpha$,21-tetrol-3,20-dione.

1 g. of the above compound was dissolved in a mixture of 10 cc. of pyridine and 3 cc. of propionic anhydride, the mixture was kept at room temperature overnight, poured into water, heated on a steam bath for half an hour and cooled. The precipitate was filtered, washed with water and dried. Crystallization from acetone-hexane give the 16,21-dipropionate of 6-fluoro-$\Delta^{4,6}$-pregnadien-11$\beta$,16$\alpha$,17$\alpha$,21-tetrol-3,20-dione.

*Example VII*

By the method of Example VI, the ester groups of $\Delta^{4,6}$- and $\Delta^{1,4,6}$-compounds, enumerated in the table of Example V, were hydrolyzed. In some cases such hydrolysis was carried out by treating with methanolic solution of 1% potassium at temperatures around 5° C. under nitrogen atmosphere and for 1 hour, using approximately 50 cc. of the potassium hydroxide solution for 1 g. of the steroid. By the method of Example VI, the primary and secondary hydroxyl groups of the dienes and trienes were esterified; specifically by using the corresponding anhydrides of acids, the diacetates, dibenzoates and dicyclopentylpropionates of such compounds were prepared.

I claim:

1. A compound of the following formula:

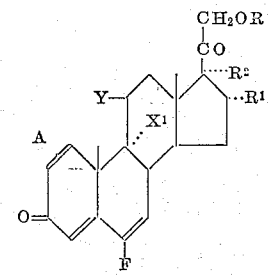

wherein A is selected from the group consisting of a double bond and a single bond; $X^1$ is selected from the group consisting of hydrogen, fluorine and chlorine, Y is selected from the group consisting of =O and

R is selected from the group consisting of hydrogen and a hydrocarbon carboxylic acyl group of less than 12 carbon atoms, $R^1$ is selected from the group consisting of hydroxy and hydrocarbon carboxylic acyloxy containing less than 12 carbon atoms; $R^2$ represents hydroxy and $R^1$ and $R^2$ together represent the grouping

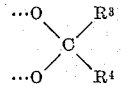

in which $R^3$ is selected from the group consisting of hydrogen and lower alkyl and $R^4$ is lower alkyl.

2. 6-fluoro-$\Delta^{4,6}$-pregnadiene-16$\alpha$,17$\alpha$,21-triol-3,11,20-trione.

3. 6-fluoro-$\Delta^{4,6}$-pregnadiene-16$\alpha$,17$\alpha$,21-triol-3,11,20-trione 21-acetate.

4. 6-fluoro-$\Delta^{4,6}$-pregnadiene-11$\beta$,16$\alpha$,17$\alpha$,21-tetrol-3,20-dione.

5. 6-fluoro-$\Delta^{4,6}$-pregnadiene-11$\beta$,16$\alpha$,17$\alpha$,21-tetrol-3,20-dione 21-acetate.

6. 6-fluoro-$\Delta^{4,6}$-pregnadiene-11$\beta$,16$\alpha$,17$\alpha$,21-tetrol-3,20-dione 21-propionate.

7. 6-fluoro-$\Delta^{4,6}$-pregnadiene-11$\beta$,16$\alpha$,17$\alpha$,21-tetrol-3,20-dione 16-acetate 21-cyclopentylpropionate.

8. 6-fluoro-$\Delta^{4,6}$-pregnadiene-11$\beta$,16$\alpha$,17$\alpha$,21-tetrol-3,20-dione 16,21-dipropionate.

9. 6,9α-difluoro - Δ⁴,⁶ - pregnadiene - 11β,16α,17α,21-tetrol-3,20-dione.

10. 6,9α-difluoro - Δ⁴,⁶ - pregnadiene - 11β,16α,17α,21-tetrol-3,20-dione 16,21-dipropionate.

11. 6,9α-difluoro - Δ⁴,⁶ - pregnadiene - 11β,16α,17α,21-tetrol-3,20-dione 16,17-acetonide 21-acetate.

12. A compound of the formula

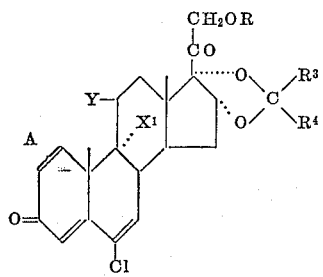

wherein A is selected from the group consisting of a double bond and a single bond; $X^1$ is selected from the group consisting of hydrogen, fluorine and chlorine, Y is selected from the group consisting of =O and

R is selected from the group consisting of hydrogen and a hydrocarbon carboxylic acid acyl group of up to 12 carbon atoms, $R^3$ is selected from the group consisting of hydrogen and lower alkyl; and $R^4$ is lower alkyl.

13. 6-chloro - Δ⁴,⁶ - pregnadien - 11β,16α,17α,21-triol-3,20-dione 16,17-acetonide 21-acetate.

14. 6-fluoro - Δ¹,⁴,⁶ - pregnatriene - 16α,17α,21-triol-3,11,20-trione.

15. 6-fluoro - Δ¹,⁴,⁶ - pregnatriene - 16α,17α,21-triol-3,11,20-trione 21-acetate.

16. 6-fluoro - Δ¹,⁴,⁶ - pregnatriene - 11β,16α,17α,21-tetrol-3,20-dione.

17. 6-fluoro - Δ¹,⁴,⁶ - pregnatriene - 11β,16α,17α,21-tetrol-3,20-dione 21-acetate.

18. 6-fluoro - Δ¹,⁴,⁶ - pregnatriene - 11β,16α,17α,21-tetrol-3,20-dione 21-propionate.

19. 6-fluoro - Δ¹,⁴,⁶ - pregnatriene - 11β,16α,17α,21-tetrol-3,20-dione 16-acetate 21-cyclopentylpropionate.

20. 6-fluoro - Δ¹,⁴,⁶ - pregnatriene - 11β,16α,17α,21-tetrol-3,20-dione 16,21-dipropionate.

21. 6,9α-difluoro-Δ¹,⁴,⁶-pregnatriene - 11β,16α,17α,21-tetrol-3-20-dione.

22. 6,9α-difluoro-Δ¹,⁴,⁶ - pregnadiene - 11β,16α,17α,21-tetrol-3,20-dione 16,21-dipropionate.

23. 6,9α-difluoro-Δ¹,⁴,⁶-pregnatriene - 11β,16α,17α,21-tetrol-3,20-dione 16,17-acetonide 21-acetate.

24. 6-chloro-Δ¹,⁴,⁶-pregnatriene - 11β,16α,17α,21-tetrol-3,20-dione 16,17-acetonide 21-acetate.

No references cited.

LEWIS GOTTS, *Primary Examiner.*